April 15, 1952     F. W. SCHARF     2,592,826
TOASTER TIMING MECHANISM

Filed Jan. 3, 1947     2 SHEETS—SHEET 1

INVENTOR.
Frank W. Scharf.
BY Bair & Freeman
Att'ys.

April 15, 1952  F. W. SCHARF  2,592,826
TOASTER TIMING MECHANISM
Filed Jan. 3, 1947  2 SHEETS—SHEET 2
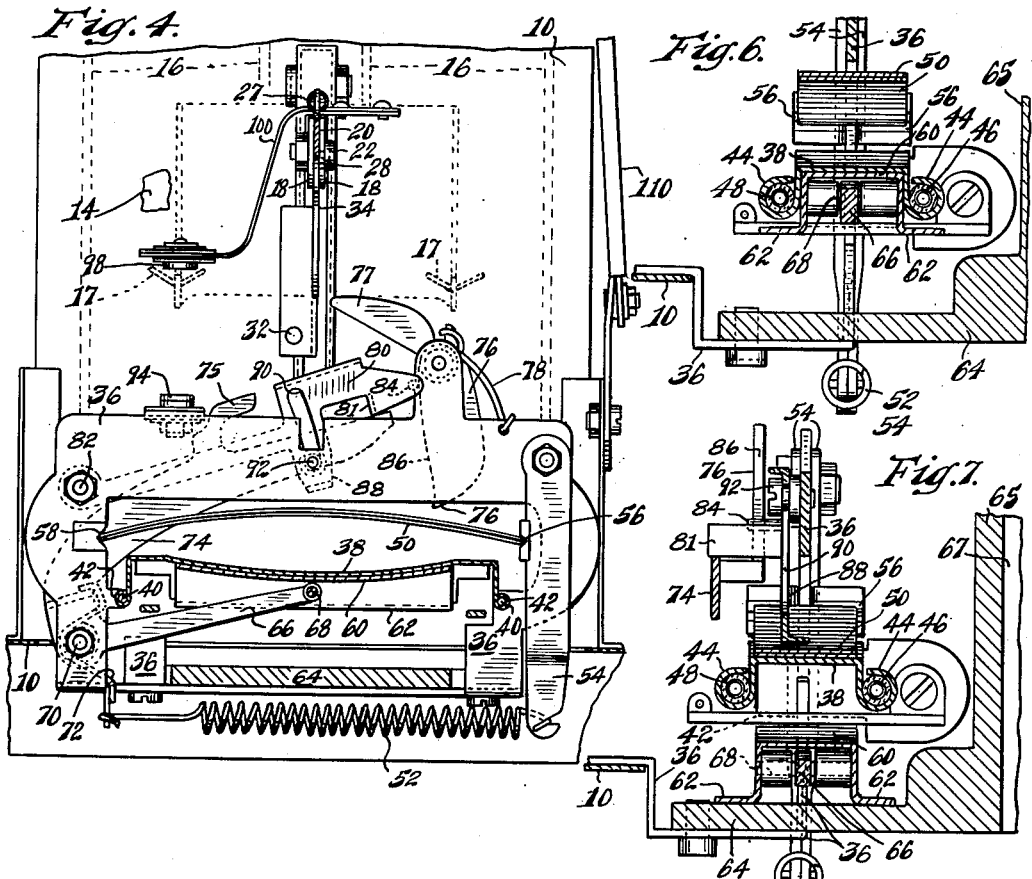
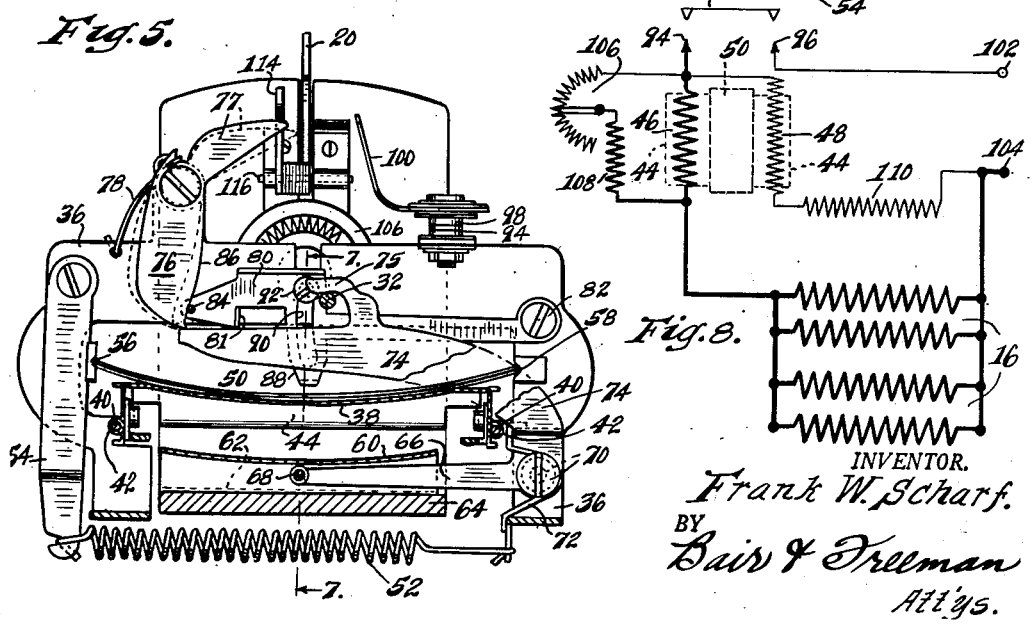
INVENTOR.
Frank W. Scharf.
BY Bair & Freeman
Att'ys.

Patented Apr. 15, 1952

2,592,826

UNITED STATES PATENT OFFICE 2,592,826

TOASTER TIMING MECHANISM

Frank W. Scharf, Arcadia, Calif., assignor, by mesne assignments, to Knapp-Monarch Company, St. Louis, Mo., a corporation of Delaware Application January 3, 1947, Serial No. 720,065

6 Claims. (Cl. 161—1)

My present invention relates to a toaster timing mechanism and particularly one capable of producing successive slices of toast which are substantially uniform in color.

One object of the invention is to provide a toaster timer having a heating element, and a bimetal element heated thereby, together with means to provide for quick recycling of the timer so there is no waiting between toasting operations. The timing means includes a heat transfer shoe engageable with the heating element when the bimetal element snaps to "off" position and engageable with a heat dissipator during the timing cycle.

Another object is to provide means for moving a heat transfer shoe in synchronism with latching and latch releasing mechanism of the timer.

Still another object is to provide timing mechanism in which a timing heater is rapidly cooled and a bimetal element heated thereby during the timing period is spaced from the heater so that it can also cool rapidly, the bimetal element staying so spaced until a subsequent toasting and timing cycle is initiated.

A further object is to provide a timer that is constructed and has such a circuit arrangement as to compensate for general temperature rise of the toaster and produce substantially uniform toast.

With these and other objects in view, my invention consists in the construction, arrangement and combination of the various parts of my timer whereby the objects contemplated are attained, as hereinafter more fully set forth, pointed out in my claims and illustrated in the accompanying drawings, wherein:

Figure 1 is an end elevation of the toaster embodying my present invention.

Figure 2 is an enlarged vertical sectional view on the line 2—2 of Figure 1 showing the timer in cold or inoperative position.

Figure 3 is a sectional view on the line 3—3 of Figure 2.

Figure 4 is a sectional view on the line 4—4 of Figure 2.

Figure 5 is a view similar to Figure 3 showing the timer adjusted for initiating a timing cycle.

Figures 6 and 7 are sectional views on the lines 6—6 and 7—7 of Figures 3 and 5, respectively, and Figure 8 is an electro-diagrammatic view of the circuits within the toaster and its timing mechanism.

In the accompanying drawings, I have used the reference numeral 10 to indicate a toaster base and 12 a housing for the toaster mechanism. Within the housing 12 a pair of toasting compartments 14 are provided having the usual heating elements 16 shown diagrammatically in Figure 8 and provided for the purpose of toasting bread inserted into the toasting chambers 14. The usual bread carriers 17 are provided, which in the toaster illustrated, have an operating extension or arm 18 movable vertically with respect to the toasting chambers 14. The bread carriers are biased to move upwardly in the usual manner such as disclosed in my copending application Serial No. 720,063, filed January 3, 1947, now Patent No. 2,558,199, dated June 26, 1951.

For depressing the bread carriers 17, I provide a bread carrier lever 20 pivoted thereto at 22 and terminating in an operating knob 24. The lever extends through a slot 26 in a housing 12. The lever 20 is normally in the position shown by full lines in Figure 2 but when the knob 24 is depressed the first movement is to the dotted position against the bias of a spring 27, which movement is permitted by a stop lug 28 and a slot 30 on the bread carrier 18 and in the lever 20, respectively. The bread carrier 18 is also provided with a pin 32 which together with a downward extension 34 of the lever 20 cooperate with the timing mechanism as will be hereinafter described. Movement of the lever 20 to the dotted position is limited by the extension 34 engaging a lug 35.

Mounted on the base 10 is a bracket 36 forming a stationary frame for my timing mechanism, which will now be described: A heater plate 38 is mounted stationary with respect to the bracket 36 by means of pins 40 through ears 42 of the heater plate 38. The heater plate is channel shape in cross section as shown in Figures 6 and 7 and provided with a pair of tubular side edges 44 adapted to receive a pair of heaters 46 and 48. These are electrical timing heaters which when energized transmit heat to the heater plate 38 and such heat is conducted to a bimetal timer strip 50 in contact therewith as in Figure 7.

The top of the heater plate 38 is concave as shown in Figure 5 so that the bimetal 50 rests against it when bowed to the position shown, the bowing tendency being imparted to the bimetal element by means of a spring 52 connected with a lever 54. The lever 54 has a V seat 56 receiving one end of the bimetal element and its other end is received in a stationary V seat 58 secured to the frame 36. Due to this construction, the bimetal element 50 may be sprung down as in Figure 5 or up as in Figure 4. A cover 53 is provided for the spring 52. It will be noted that the plate 38 is concave to fit the strip 50 when bowed down, the purpose being to secure good thermal contact and therefore good heat conduction.

Contacting at times with the lower surface of the heater plate 38 is a heat transfer shoe 60 shown in cross section in Figure 6. The shoe 60 has flanges 62 which are adapted to contact at other times with a heat dissipator or radiator 64 as in Figure 7 (when the heat transfer shoe is in the lowered position). The shoe 60 acts to remove heat quickly from the heater plate 38 to prevent a second toasting cycle, though following closely a first cycle, from being unduly shorted due to the residual heat in the plate 38.

The shoe 60 is carried by an arm 66 pivoted to the center of the shoe as at 68, the arm 66 being pivoted to the frame 36 at 70. A spring 72 normally constrains the lever 66 to rotate clockwise in Figure 3 to the position shown, and the lever 66 is part of a latch lever 74 with which a catch 76 engages as in Figure 5 to retain the levers 66 and 74 in a counterclockwise position as shown in this figure. A spring 78 tends to rotate the catch 76 clockwise in Figures 3 and 5.

A catch release lever 80 is pivoted at 82 to the frame 36 and has a pin 84 to engage a cam surface 86 of the catch 76. The catch release lever 80 also has an extension 88 adapted to contact or be contacted by the bimetal element 50 under certain circumstances and this extension is slotted as at 90 to co-act with a screw 92 which serves to limit the upward and downward movement of the catch release lever.

A pair of stationary contacts 94 and 96 are mounted on the bracket 36 and insulated from it. A bridging contact 98 is carried by a spring arm 100 connected to the bread carrier arm 18. The contacts are open in Figures 3 and 4, and are adapted to close as in Figure 5 for establishing bread toasting and timing circuits.

Referring to Figure 8, the contact 96 is connected to a current supply terminal 102 and the contact 94 is connected to the heater 46. The heater 46 is also connected to the bread toasting heating elements 16, which in turn are connected to a second current supply terminal 104. Thus the heater 46 and the heating element 16 are in series with each other and both are under control of the main switch 94—96—98. For changing the timing period and thereby securing "color control" for the toast, the heater 46 may be shunted by a rheostat 106. A fixed resistor 108 is in series with the rheostat to prevent short circuiting the heater 46.

I have found that with only the heater 46 there is a tendency for successive slices of toast to become lighter in color due to shortening of the timing period because of the general rise in temperature of the toaster. To compensate for this tendency I provide the second heater 48 and a resistor 110. They shunt the heater 46 and the heating elements 16 or are "across the line." The resistor 110 has a highly positive co-efficient of resistance. For instance, this resistor may be made of Hytemco wire. Accordingly, as the toaster temperature rises, the resistance of the element 110 increases rapidly, thereby cutting down the current flow through the heater 48 and lengthening the timing period with respect to its length if the heater 48 and the resistor 110 were not provided.

*Practical operation*

In the operation of my disclosed toaster, when the parts are in the cold position of Figures 2, 3, 4 and 6, the bimetal element 50 is bowed upwardly. After the bread is placed on the bread carrier, the knob 24 is depressed which swings the extension 34 of the lever 20 to the dotted position of Figure 2 and in alignment with the upper edge of the latch releasing lever 80. Further downward movement depresses the bread carrier arm 18 and causes the extension 34 to engage the catch release lever 80 and the pin 32 of the bread carrier arm to engage the upper edge of the latch lever 74. Further downward movement causes a hook 75 on the lever 74 to assume a position over the pin 32 to hold the bread carrier in lowered or toasting position as in Figure 5. The latch lever 74 in turn is held by the catch 76 which is moved by the spring 78 from the position of Figure 3 to the position of Figure 5 after the left hand end of the latch lever 74 passes the lower end of the catch 76.

During the downward movement of the catch releasing lever 80, its extension 88 engages the bimetal element 50 and snaps it from the upwardly bowed position of Figure 3 to the downwardly bowed position of Figure 5. The latch lever 74 through the lever 66 moves the heat transfer shoe 60 to a position of contact with the heat dissipator 64.

Since the bridging contact 98 is now in contact with the stationary contacts 94 and 96, the toasting and timing circuits are established and the heaters 46 and 48 commence to heat up the heater shoe 38. At the end of the timing period as set by the knob 107 of the rheostat 106, the bimetal 50 snaps upwardly again to the position of Figure 3. In so doing, it swings the catch release lever upwardly as shown by dotted lines in Figure 5 so that the pin 84 traveling along the cam surface 86 will swing the catch 76 clockwise and release the latch lever 74. This permits the bread carriers 17 to move upwardly under their spring bias as already described by reason of the hook 75 permitting release of the pin 32. The spring 72 of the latch lever 74 will swing the latch lever upwardly as soon as the catch 76 releases the latch lever and will also engage an extension 81 of the catch release lever to move this lever the rest of the way upwardly to its initial position and out of the way of the bimetal element 50.

Upward movement of the latch lever 74 causes upward movement of the heat transfer shoe 60 as to the position of Figures 3, 4 and 6 so that this shoe will absorb heat from the heater plate 38, thus conditioning it for an immediate re-cycling of the timer as soon as other slices of bread can be placed in the toaster with no waiting necessary. When the toaster is reset as in Figure 5, the shoe 60 then contacts with the heat dissipator 64 so that the heat can be quickly carried away from the shoe 60. The bimetal 50 also remains spaced from the plate 38 till reset, thus contributing to quick cool-down for fast cycling.

The heat transfer shoe 60 is made of suitable metal, such as copper, and the heat dissipator of aluminum or the like for quick heat absorption and dissipation respectively to permit maximum efficiency in quick re-cycling of the toaster timing mechanism. The dissipator 64 may have a vertical portion 65 provided with ribs or flanges 67 to increase the transmission of heat from the dissipator to atmosphere.

The initial downward movement of the knob 24, as already stated, moves the lever 34 into alignment with the latch lever 74. Upon releasing the knob 24, the lever 34 swings out again to the solid line position so that it is out of the way of the catch release lever 80 when it is raised by the bimetal element 50.

In the event that it is desirable to manually release the bread carrier before the end of the timing period, this is readily accomplished by a small knob 112 on a lever 114 pivoted to the plate 65 at 116. The inner end of the lever 114 is adapted to engage an extension 77 of the catch 76 when the knob 112 is raised, thereby manually releasing the catch from the latch lever 74 as shown by dotted lines in Figure 5. Manual release of the bread carriers results in elevation of the bread and opening of the main switch 94—96—98 without causing the bimetal element 50 to bow upwardly. As a result, the timing period is not upset and after inspection of the toast, the knob 24 can again be depressed for continuing the same timing cycle without the toast being "off-color" at the end of the timing period. The bimetal element has the characteristic of normally staying in either bowed position and moves from the downwardly bowed position to the upwardly bowed position only when heated to a predetermined position by the heater plate 38. When a timing cycle is initiated, the bimetal is snapped from its upper position to its lower position and remains there regardless of its temperature as the toaster cannot be recycled quickly enough to result in reopening of the timer after it is closed. Quick heat dissipation from both the bimetal element 50 and the shoe 60 effect this desirable result.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a timer mechanism, a timer including an electric heater and a thermally responsive member, means to effect engagement between the two upon initiation of a timing period, a heat transfer shoe engageable with said heater at the termination of the timing period, and a heat dissipator with which said shoe is engageable during the timing period.

2. A timer mechanism comprising a heater and a thermally responsive member, means to effect engagement between the two upon initiation of a timing period, a heat transfer shoe engageable with said heater, means to initiate a timing cycle, said means engaging said thermally responsive member with said heater, a catch to latch said means in timing position, said thermally responsive member being operable to release said catch at the termination of the timing period, and a heat dissipator with which said means engages said heat transfer shoe during the timing period.

3. In a timer device of the character disclosed, an electrical heater, a bowed bimetal element to be heated by engagement therewith and to bow away therefrom when heated thereby to a predetermined temperature, a latch lever, a catch for said latch lever in position with said bimetal element engaging said heater, means operable from said bimetal element when heated to a predetermined degree for releasing said catch, and a heat transfer shoe spaced from said heater during the timing period and engageable with said heater upon release of said catch.

4. In a timer for an electrical appliance, a heater, a thermostat primarily responsive to the heat generated by said heater for measuring and terminating the appliance cycle, means to modify the action of said heater and thereby said thermostat in response to differences in the ambient temperature of the device at the start of successive cycles comprising a resistor in circuit with said heater and having a highly positive temperature coefficient of resistance, and means to absorb the heat of the heater when the thermostat is out of the circuit, said last means including a heat radiator for dissipating the heat of said means when the thermostat is in the circuit in order to render the thermostat operable in cycles of rapid succession.

5. An electrical appliance, a timer thermostat responsive to heat generated during operation of the appliance for measuring and terminating a cycle of operation of the appliance, and means to absorb the heat of the heater when said thermostat is in the open position, said last means including a heat transfer shoe and a heat radiator for dissipating the heat absorbed by said shoe when the thermostat is in the closed position.

6. In a timer device, a thermostat, a heater therefor to operate the thermostat and thereby cause it to open a circuit controlled thereby, and means for rapidly cooling said heater comprising a heat absorbing radiator, a heat transfer shoe engageable with the heater of said thermostat during the off cycle of the timer and with said radiator during the timing cycle, said thermostat being of snap acting type and capable of remaining in either one of two positions when moved to such positions, the heat of said heater effecting the movement thereof to one of said positions, and means to manually move said thermostat to its other position.

FRANK W. SCHARF.

REFERENCES CITED

The following references are of record in the file of this patent:

UNITED STATES PATENTS

| Number | Name | Date |
| --- | --- | --- |
| 2,196,393 | Ireland | Apr. 9, 1940 |
| 2,197,221 | Koci | Apr. 16, 1940 |
| 2,250,979 | Winborne | July 29, 1941 |
| 2,271,485 | Koci | Jan. 27, 1942 |
| 2,302,117 | Gomersall | Nov. 17, 1942 |
| 2,422,199 | Koci | June 17, 1947 |